United States Patent

Fargo

[11] Patent Number: 5,859,395
[45] Date of Patent: Jan. 12, 1999

[54] METHOD FOR GENERATING VELOCITY PROFILES FOR ELEVATOR CAR DOORS

[75] Inventor: Richard N. Fargo, Plainville, Conn.

[73] Assignee: Otis Elevator Company, Farmington, Conn.

[21] Appl. No.: 754,456

[22] Filed: Nov. 21, 1996

[51] Int. Cl.⁶ .................................................. B66B 13/14
[52] U.S. Cl. ............................................ 187/316; 187/293
[58] Field of Search .................................... 187/316, 293, 187/295; 318/265, 257, 268

[56] References Cited

U.S. PATENT DOCUMENTS

| | | | |
|---|---|---|---|
| 5,159,281 | 10/1992 | Hedstrom et al. | 329/312 |
| 5,162,711 | 11/1992 | Heckler | 318/264 |
| 5,384,439 | 1/1995 | Ernecke et al. | 187/316 |
| 5,410,617 | 4/1995 | Kidd et al. | 382/51 |
| 5,495,918 | 3/1996 | Peruggi et al. | 187/316 |
| 5,541,955 | 7/1996 | Jacobmeyer | 375/222 |

*Primary Examiner*—Robert E. Nappi

[57] ABSTRACT

A method for generating velocity profiles for elevator car doors includes a step of generating a straight line velocity versus time profile. The profile is then passed through a low pass finite impulse response filter to smooth the transition between different velocity and acceleration values and to limit certain undesired frequencies. The filtered profile can be integrated into a position versus time profile and stored in the RAM of a control system to be used for subsequent operations.

4 Claims, 2 Drawing Sheets

METHOD FOR GENERATING VELOCITY PROFILES FOR ELEVATOR CAR DOORS

CROSS-REFERENCE TO RELATED APPLICATIONS

This application is related to a commonly owned co-pending application filed on the same day herewith having Ser. No. 08/754,457.

TECHNICAL FIELD

The present invention relates to elevator car door systems and, more particularly, to the generation of velocity therefor.

BACKGROUND OF THE INVENTION

In elevator systems, elevator car doors are driven into opened and closed positions by an electric motor. The elevator car doors usually couple to hoistway doors to drive hoistway doors into open and closed positions. The elevator car doors typically have to maintain a certain velocity at the beginning of an operation, in the middle of the operation, and at the end of the operation. For example, as the doors are opening, the initial velocity is relatively low to allow time for the elevator car doors to couple to the hoistway doors. After the two sets of doors are coupled, the doors accelerate to a higher velocity. The doors then decelerate toward the end of the opening operation to avoid slamming against a fixed stop.

A number of methods are used to achieve the change in velocity of the elevator car doors during various operations. A conventional approach to changing the velocity of elevator car doors is to use resistors. The resistors are placed in series with a voltage source and a DC motor and adjusted to provide smaller or greater values of resistance. The greater resistance value corresponds to slower DC motor operation and to smaller generated velocity output. The converse is true for the smaller resistance values. However, this approach has a number of limitations. First, resistors cannot compensate for changes in friction or other loading on the doors. Second, when resistors heat up, the resistance value changes and results in changes in the velocity of the elevator car doors. Such changes in velocity are highly undesirable because this does not provide a consistently smooth profile. Third, resistors are adjusted by a trial and error method, which is time consuming and frequently lacks the necessary precision.

Another approach to varying the velocity of elevator car doors in modern closed loop systems includes software generated velocity profiles. The software dictates what the door velocity should be at a given time or distance. The velocity profiles are generated for each operation of the elevator car doors. This approach either results in a time lag for the doors to respond to a command or requires a powerful processor to generate profiles in real time.

Additionally, it is highly desirable to have smooth transitions from one velocity value to another. The transition from one velocity level to another is currently achieved by building in constant jerk (rate of change in acceleration divided by rate of change in time) segments and constant acceleration segments of the profile. The constant jerk segments, used to smooth the corners of the transition from constant velocity phase to constant acceleration phase of the doors, must match values of velocity and acceleration where the constant jerk segments join the constant acceleration phase and the constant velocity phase. Matching the constant jerk segment with the constant acceleration phase and the constant velocity phase at numerous transition points takes a great deal of processor time.

Furthermore, a door control system cannot cause the doors to follow the high frequency components of the profile if these frequency components are higher than the bandwidth of the control system. This can cause misoperation of the elevator car doors, such as the doors overshooting the final position and hitting the stops or exciting resonant vibration frequency of the doors. The velocity profiles can be broken down to show the frequency content through a Fourier transform method. The profiles include low and high frequency components of velocity. Although the current method of providing constant jerk segments lowers the frequency content of the velocity profile by minimizing sharp corners, it is not known how much of the higher frequency content is attenuated and what the frequency content of the profile is. Besides causing misoperation, the constant jerk method of generating a profile could result in very low frequency content and an associated increase in door operation time as compared to the optimum operation time.

DISCLOSURE OF THE INVENTION

It is an object of the present invention to improve operation of elevator car doors by ensuring smooth opening and closing operations as the velocity of the doors changes during these operations.

It is another object of the present invention to reduce the processor time required for generating velocity profiles for elevator car door operations.

According to the present invention, a velocity versus time profile for moving elevator car doors is passed through a filter, integrated into a position versus time profile, and then stored as part of an initialization procedure of the elevator car doors so that for every subsequent operation of the elevator car doors, the doors follow the stored position versus time profile. The initial velocity versus time profile is a straight line profile and is passed, in the best mode embodiment of the present invention, through a low pass finite impulse response (FIR) filter that limits the frequency content of the profile to the bandwidth of the control system and ensures smooth transitions between different velocity levels of the elevator car doors during each operation. Limiting the frequency content of the profile ensures that the profile matches the bandwidth of the control system and, therefore, the actual door motion can follow the filtered velocity profile. Since the position versus time profile is stored, a new profile does not need to be generated for each door operation, thereby saving real time and processor time.

One advantage of the present invention is that the door operation time can be tailored for the bandwidth of the control system.

Another advantage of the present invention is that misoperation of the elevator car doors, such as the doors overshooting the final door position, is prevented.

An additional advantage of the present invention is that resonant vibration modes of the door system are not excited.

The foregoing and other advantages of the present invention become more apparent in light of the following detailed description of the exemplary embodiments thereof, as illustrated in the accompanying drawings.

BEST MODE FOR CARRYING OUT THE INVENTION

Figure 1:
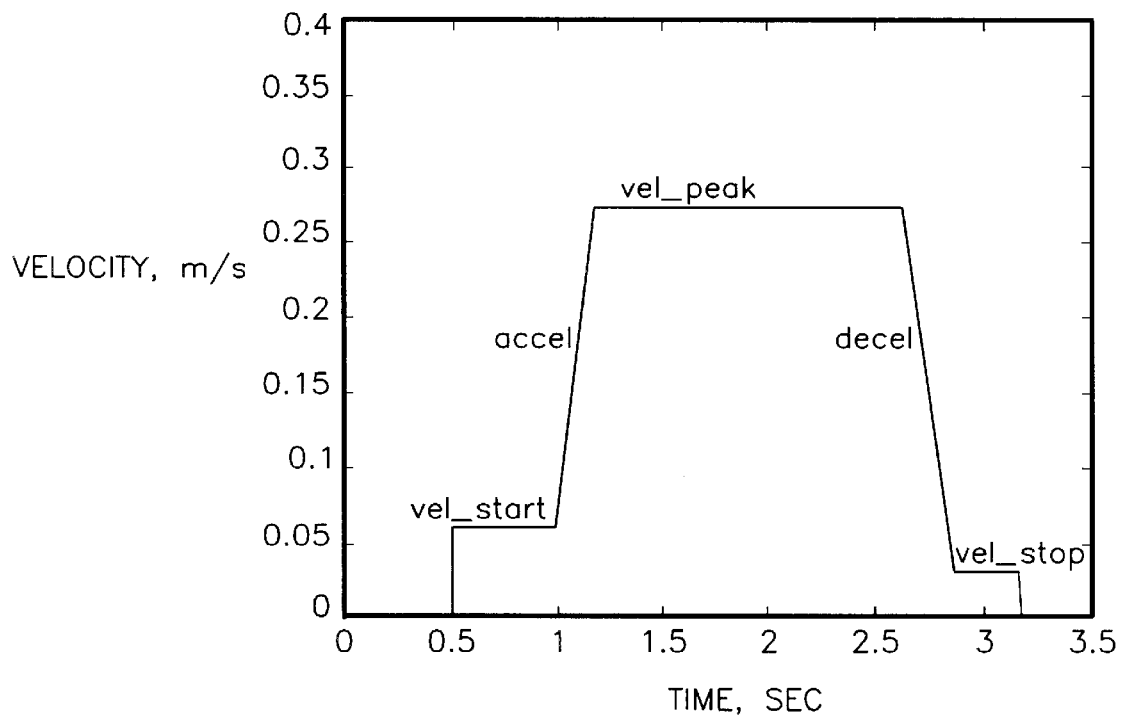
FIG. 1 is a plot of a straight line velocity versus time profile for a closing operation of elevator car doors.

Referring to FIG. 1, a straight line velocity versus time profile is generated in the software of an elevator car door operating system as the elevator car door system is powered. The straight line velocity versus time profile represents the desired velocity values at certain times of the door operating function. For example, at the beginning of an opening door function, velocity values are relatively low to allow the hoistway doors to couple to the elevator car doors. Once the coupling is completed, the doors accelerate to a higher velocity value, shown in FIG. 1 as a velocity peak. The higher velocity value is maintained until the doors decelerate to a stop velocity. The lower velocity value is frequently necessary toward the end of a door operation to either decelerate the elevator car doors, or in the case of a closing operation to allow the hoistway doors to decouple from the elevator car doors.

The straight line profiles are typically generated for each door function, such as opening, closing, reversing, or for different speeds required at various floors. The parameters determining the shape of the straight line velocity versus time profile can change. Such changes in parameters require recalculation of a new straight line velocity versus time profile.

Figure 2:
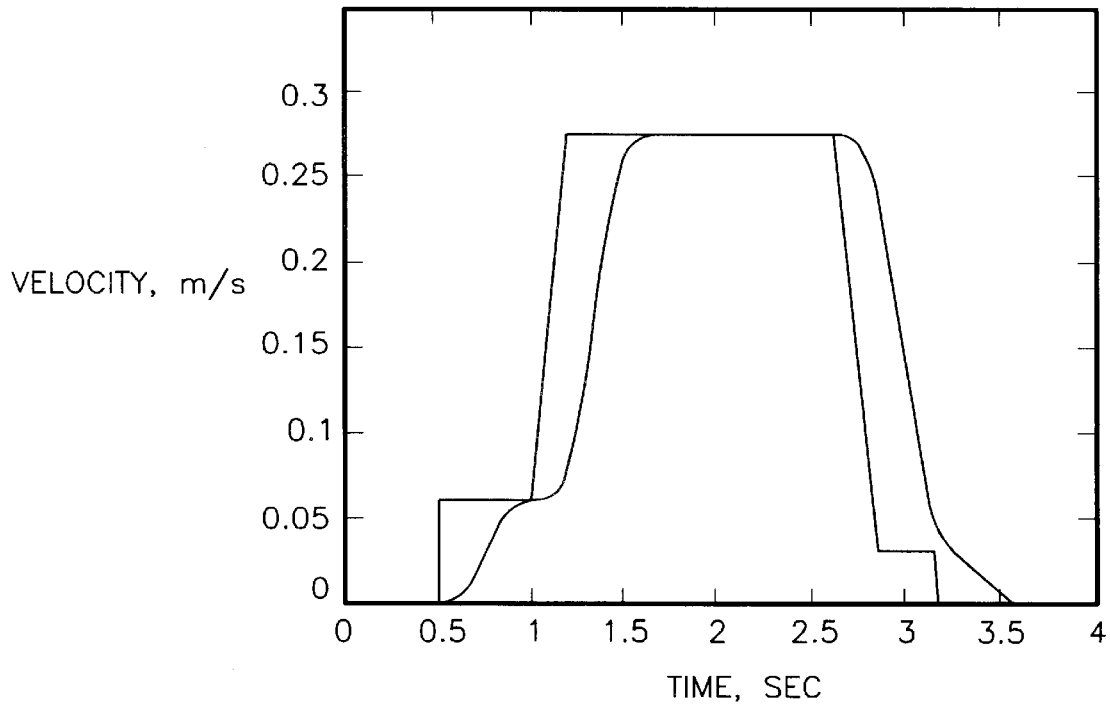
FIG. 2 is a plot of the straight line velocity versus time profile of FIG. 1 and of a filtered velocity versus time profile.

Referring to FIG. 2, the straight line velocity versus time profile is passed through a low pass finite impulse response (FIR) filter. The low pass filter attenuates high frequencies and ensures that the frequency content of the profile matches the bandwidth of a position feedback control system. In the preferred embodiment of the present invention, the control system has a 1 to 2 Hertz (Hz) position control bandwidth. The finite impulse response filter calculates the moving weighted average rounding the corners of the straight line velocity versus time profile to ensure smooth transitions between different velocity values.

Although the best mode embodiment describes the use of a low pass finite impulse response filter, a low pass infinite impulse response (IIR) filter could be used also.

Figure 3:
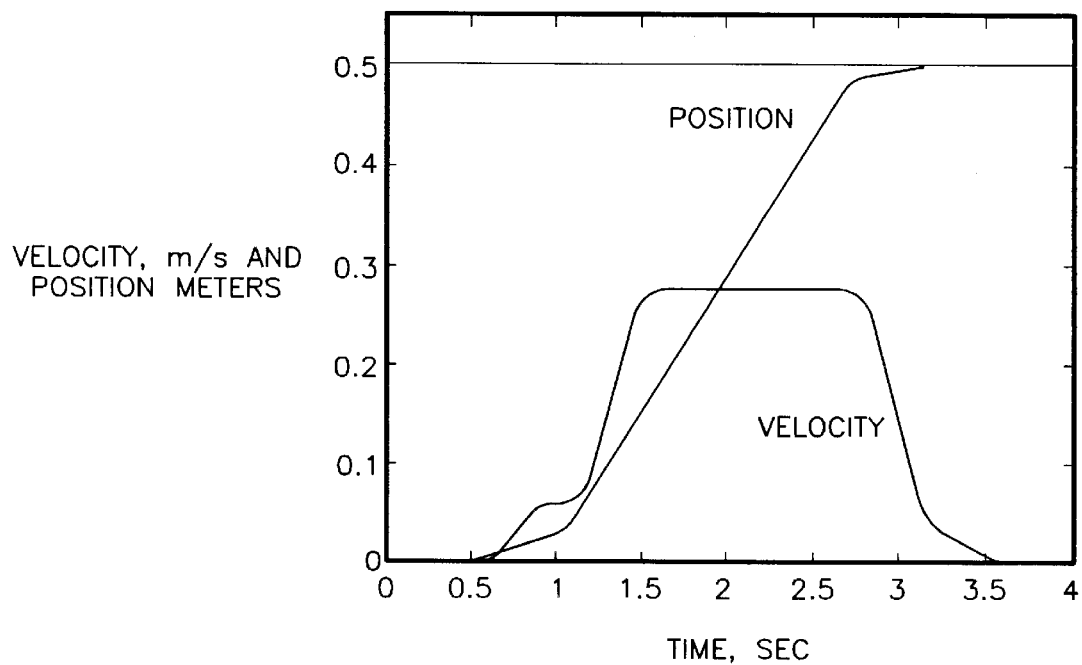
FIG. 3 is a plot of the filtered velocity versus time profile of FIG. 2 and an integrated position versus time profile, according to the present invention.

Referring to FIG. 3, in the preferred embodiment of the present invention, the filtered velocity versus time profile is integrated to obtain a position versus time profile. Thus, for each point on a filtered velocity versus time profile another point is calculated and plotted as a point on the position versus time profile. The position versus time profile is generated in the preferred embodiment because the closed loop control system of the door operator used in this application is a position control system. However, in other applications that use a velocity control system, the filtered velocity versus time profile can be used as an input into the velocity control system.

The position versus time profile for each elevator car door operation is then stored in the RAM of the control system.

In operation, when the elevator car door operating system is initially powered, a straight line velocity versus time profile is generated as part of the initialization procedure. The straight line velocity versus time profile is then passed through the low pass FIR filter. The filtered velocity versus time profile is then integrated into the position versus time profile, depending on the input required for the control system. The profile is then stored for future use. When the door controller receives a command to move the elevator car doors, the controller retrieves the stored position versus time profile for the appropriate operation.

One major benefit of the present invention is that the door controller does not need to generate a profile for every command and take-up valuable processor time. Another major benefit of the present invention is that the frequency content of the filtered profile matches the bandwidth of the closed loop control system. This prevents misoperation of the elevator car doors, such as overshooting of the final position. Also, as high frequency content is attenuated, resonant vibration modes of the door system are not excited.

While the present invention has been illustrated and described with respect to a particular embodiment thereof, it should be appreciated by those of ordinary skill in the art, that various modifications to this invention may be made without departing from the spirit and scope of the present invention. For example, it is fully contemplated by the present invention to pass the velocity profile through the filter for every operation of the elevator car doors without storing the profiles. Similarly, it is fully contemplated by the present invention to store unfiltered profiles to be used for subsequent operations.

I claim:

1. A method for generating velocity profiles for elevator car doors, said method comprising steps of:

generating a straight line velocity versus time profile for desired door movement;

passing said straight line velocity versus time profile through a low pass filter to obtain a filtered velocity versus time profile for limiting frequency content of said velocity versus time profile;

integrating said filtered velocity versus time profile to obtain a position versus time profile; and storing said position versus time profile.

2. The method according to claim 1 wherein said low pass filter is a low pass finite impulse response filter.

3. The method according to claim 1 wherein said low pass filter is a low pass infinite impulse response filter.

4. The method according to claim 1 wherein said position versus time profile being stored in RAM.

* * * * *